Feb. 27, 1940.　　　　L. SCHMIDT　　　　2,191,501
THERMOSTATIC CIRCUIT INTERRUPTER
Filed March 19, 1937　　　6 Sheets-Sheet 1

INVENTOR.
Lambert Schmidt
BY
Ramsey, Kent, Chisholm & Lutz
his ATTORNEYS

Feb. 27, 1940.  L. SCHMIDT  2,191,501
THERMOSTATIC CIRCUIT INTERRUPTER
Filed March 19, 1937  6 Sheets-Sheet 2
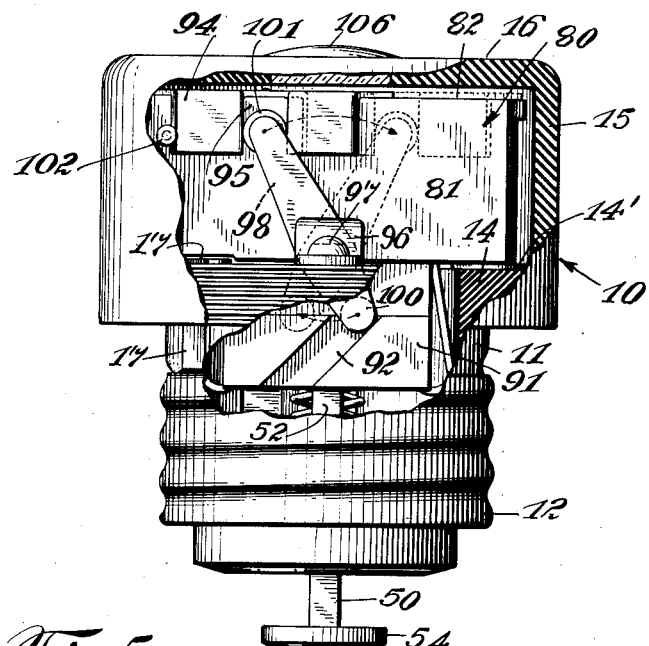
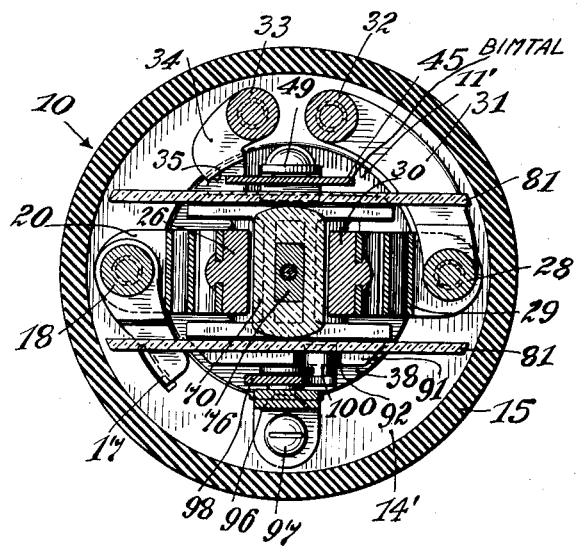
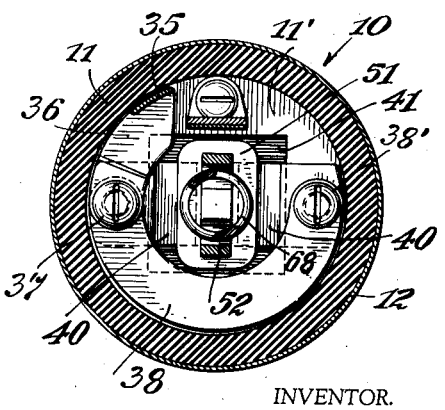
INVENTOR.
Lambert Schmidt
BY Ramsey, Kent, Chisholm & Lutz
his ATTORNEYS Feb. 27, 1940. L. SCHMIDT 2,191,501
THERMOSTATIC CIRCUIT INTERRUPTER
Filed March 19, 1937 6 Sheets-Sheet 3

INVENTOR.
Lambert Schmidt
BY
Ramsey, Kent, Chisholm & Lutz
his ATTORNEYS

Feb. 27, 1940. L. SCHMIDT 2,191,501
THERMOSTATIC CIRCUIT INTERRUPTER
Filed March 19, 1937 6 Sheets-Sheet 4
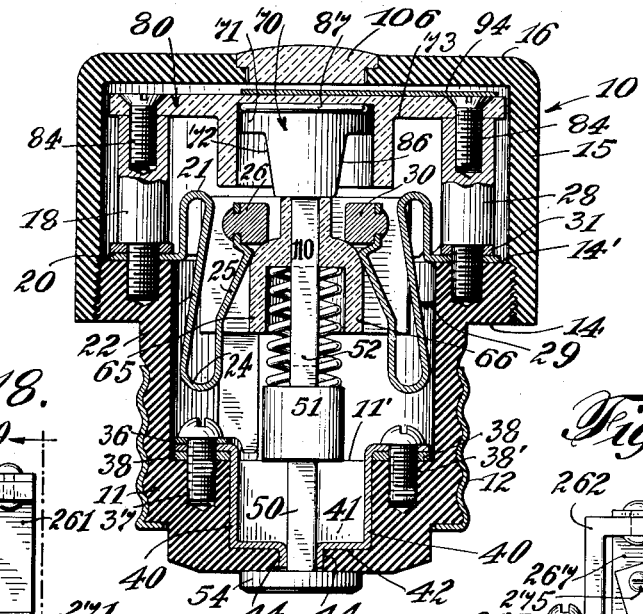
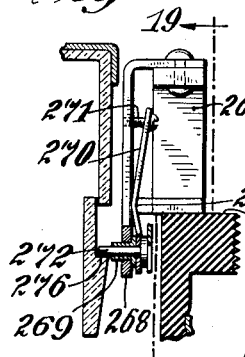
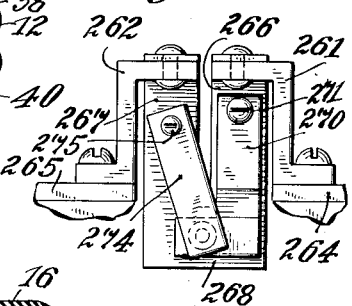
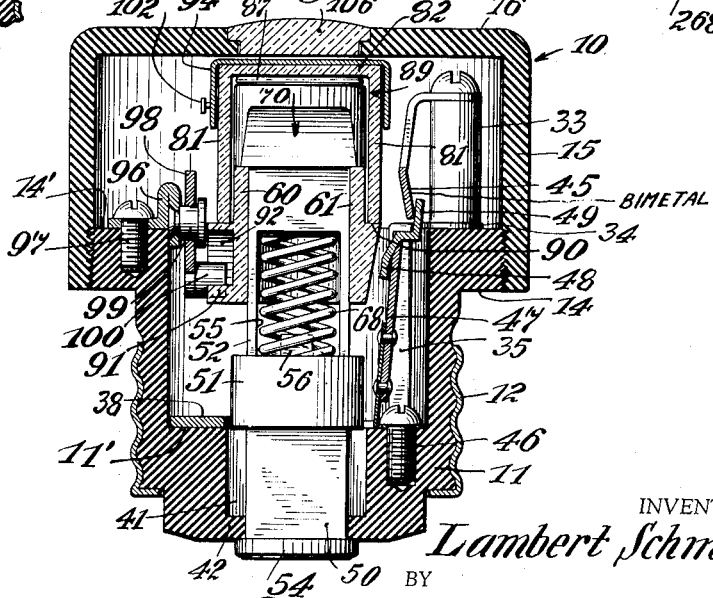
INVENTOR.
Lambert Schmidt
BY
Ramsey, Kent, Chisholm & Lutz
his ATTORNEYS Feb. 27, 1940.  L. SCHMIDT  2,191,501
THERMOSTATIC CIRCUIT INTERRUPTER.
Filed March 19, 1937  6 Sheets-Sheet 5

INVENTOR.
Lambert Schmidt
BY
Ramsey, Kent, Chisholm & Lutz
his ATTORNEYS

INVENTOR.
Lambert Schmidt
BY Ramsey, Kent, Chisholm & Lutz
his ATTORNEYS

Patented Feb. 27, 1940

2,191,501

UNITED STATES PATENT OFFICE 2,191,501

THERMOSTATIC CIRCUIT INTERRUPTER

Lambert Schmidt, Leeds, N. Y.

Application March 19, 1937, Serial No. 131,822

15 Claims. (Cl. 200—116)

This invention relates to improvements in means for and methods of interrupting current flow and more particularly to improvements in circuit breakers of a character capable of being substituted for fuse plugs or cartridge fuses of the types now in general use.

An object of the present invention is to provide a circuit breaker of such character that the same can be substituted for fuses of various types now in use without causing changes in receptacle equipment, such as cut-outs or cut-out boxes.

Another object of the invention is to provide a circuit breaker of a type wherein the same can be reset an indefinite number of times.

Another object is to provide a circuit breaker of such construction that arcing is substantially eliminated.

A further object of the invention is to provide circuit breaker construction in which means are incorporated for interrupting the flow of current without the creation of any substantial destructive arcing.

An additional object of the invention is to provide a circuit breaker construction utilizing a stationary conducting member between moving contacts, which conducting member serves only as a conductor and is not otherwise included in the circuit.

A still further object of the invention is to provide a circuit breaker construction wherein the moving contacts are actuated to move simultaneously away from the opposite sides of an intermediate conducting member so that any tendency to set up destructive arcing is substantially eliminated.

A further object of the invention is to provide a circuit breaker of the foregoing character mounted within a housing of such size and shape that the complete unit can be inserted in conventional types of plug fuse cut-outs without alteration.

As another object of the invention the construction of the circuit breaker is such that the same can be incorporated in a housing of comparable size and shape to the housing of the conventional types of cartridge fuses.

A still further object of the invention is to provide a circuit breaker construction of such character as is capable of being used as a branch circuit breaker whereby the same can be inserted in any suitable line to protect a single electrical appliance or a plurality of appliances in the same line.

An additional object of the invention is to provide a circuit breaker construction adapted to engage in ordinary outlet sockets and also to incorporate socket means to be engaged by the contact prongs of a two-prong plug.

In carrying out the foregoing and other objects of the invention, use is made of a principle in circuit breakers wherein two moving arms are so mounted and actuated as to be moved simultaneously away from an intermediate conducting member which becomes in effect a barrier between the moving contacts once these contacts have been moved out of barrier-engaging position. Due to this arrangement of moving contacts and intermediate conduct barrier it has been found in practice that destructive arcing is substantially eliminated. It is essential however that the moving contacts be so actuated as to be moved away from this barrier at the same instant and preferably at the same rate of motion. Should one contact leave its barrier engaging position ahead of the other the result would be to establish an arc between the barrier and the contact first moving out of engagement therewith. Accordingly to insure that such desired movement will be accomplished means are provided, in a circuit breaker incorporating the present invention, for mechanically moving the contacts out of engagement with the barrier at the same time and at the same rate of motion. For this purpose a shutter of insulating material is slidably mounted on the barrier bar, such shutter being held out of engagement with the contacts during the time an uninterrupted flow of current is desired, or during the time the current flow is within the proper limits. The locking device for holding the shutter in such position can be released by a thermostatic bi-metal trip of a character designed to operate on an overload of predetermined value. When the trip has been operated to release the shutter, the shutter is advanced along the barrier bar into a position wherein parts of the shutter are interposed between the barrier bar and the contacts on opposite sides thereof. The shutter is so shaped as to engage the contacts simultaneously and as to move these contacts away from the barrier bar at a uniform rate of movement.

In addition provision is made, through the agency of insulating members, for forming chambers, in conjunction with the shutter, in which chambers the movable contact terminals are isolated when they have been moved to circuit-interrupting positions. The primary shutter is constructed to move with great rapidity, thereby quickly completing the formation of such chambers. Also the rapid movement of this shutter, with consequent interposition of insulating material between the moving contact terminals and the barrier bar, serves to in effect snuff out any incipient arc which might start under any condition of circuit overload or shorting. Another advantage inherent in this type of device resides in the speed at which a circuit can be broken, due to the rapid movement of the shutter and also to the movement of the contact terminals in opposite directions, thereby increasing the distance between such terminals at approximately double the speed possible with a breaker having only a single moving terminal. Consequently the time in which destructive arcing can occur is materially reduced.

In one form of the invention the circuit breaker is mounted within a housing, a part of which is of such size and shape as to fit in ordinary screw socket cut-outs. The housing for the circuit breaker is made of some suitable insulating material preferably an insulating material of any desired composition such as a phenol condensation product. Other materials however, can be used. In the preferred construction the moving contacts are normally held out of engagement with the intermediate barrier bar until the unit has been inserted in a cut-out. At such time one of the terminals for the mechanism within the casing is moved in such fashion that the contacts are brought into engagement with the barrier bar thereby completing the electrical circuit through these contacts and through the thermostatic bi-metal trip for the shutter. The mechanism of the circuit breaker is so arranged that after the unit opens the circuit due to short circuit or overload, the operating parts thereof are automatically restored to normal position upon removal of the unit from a cut-out. As a result the device is capable of indefinite use.

Since it is desirable in some instances that a single appliance be individually protected by some current interrupting device, the present invention lends itself admirably to such practice in that a circuit breaker within this invention is constructed as before briefly described, with the exception that two socket members are mounted within the housing in such fashion as to be capable of receiving the contact prongs of a plug. The housing may be of such size and shape as to fit in an ordinary screw socket or if desired the terminals for the device may be in the form of plug prongs adapted to be received by an ordinary plug socket. In the latter construction, preferably, one of the prongs is mounted for movement and has an arm engaging the barrier bar operating mechanism whereby the operating parts of the circuit breaker can be reset by removal of the unit from its receptacle. In this manner any appliance can be separately protected.

In a still further form of the invention a circuit breaker having mechanism as before described is mounted within a cylindrical housing of size and shape corresponding to the size and shape of ordinary cartridge fuses. In this construction contact caps are provided at each end of the cylinder. One of such caps is capable of axial movement so that the operating parts of the circuit breaker can be reset after the device has operated to interrupt current flow, such resetting being accomplished by merely removing the unit from the clips engaging the caps.

Other features, objects and advantages of the invention will become apparent by reference to the following detailed description of the drawings illustrating the same, wherein:

Fig. 4 is a side elevation with the housing partially broken away to illustrate the mechanism for operating the telltale;

Fig. 5 is a section taken substantially on the line 5—5 of Fig. 3;

Fig. 6 is a section taken substantially on the line 6—6 of Fig. 3;

Fig. 9 is a section similar to those of 3 and 7 showing the mechanism in position immediately following the operating of the circuit interrupting trip mechanism;

Fig. 10 is a section similar to that of Fig. 8 illustrating the position of the parts during the same part of the operating cycle as set forth in Fig. 9;

Fig. 18 is a fragmentary vertical section of a modified form of trip arrangement for releasing the primary shutter; and Fig. 19 is a section taken substantially on the line 19—19 of Fig. 18.

Figure 1:
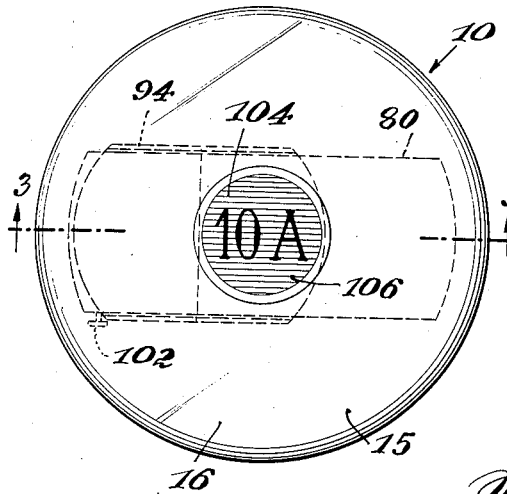
Fig. 1 is a plan view of a device embodying the invention in one form thereof and showing a telltale in one position.
Figure 2:
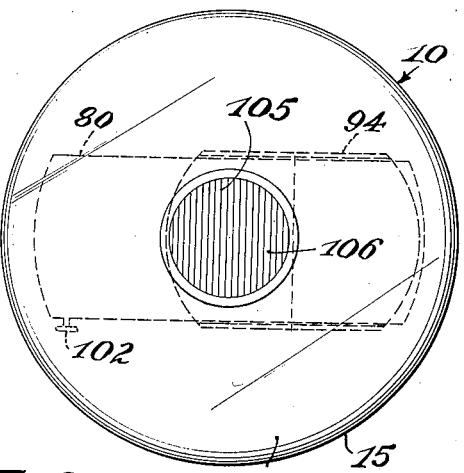
Fig. 2 is a similar view of the same device and showing the telltale in another position.

Referring now to the drawings and more particularly to Figs. 1 to 10, 10 indicates generally a housing within which the operating parts of the circuit breaker are mounted. This housing is of generally cylindrical stepped form, being made up of a part 11, the periphery of which is shaped to accommodate a metallic shell 12. This shell 12 is of form to be engaged in a screw threaded socket such as is commonly used in cut-out blocks. The device however, obviously can be engaged in any electrical socket of conventional size and shape. The part 11 has a body portion 14 to which is secured a cap part 15 in some suitable fashion as shown. These parts are in screw thread engagement but it will be apparent that the parts can be secured together in any other suitable fashion or in fact the parts 11 and 15 may be made integral if desired; in which case the top part 16 of the cap 15 could be made separate from the cylindrical portion thereof, and could be secured thereto in some suitable means. Since the shell 12 serves as one terminal for the circuit breaker, an electrical connection therewith to other parts of the device is provided by means of a metal conducting strap 17, one end of which is in contact with the shell; such strap passing upwardly through the flange 14 and then along the top surface 14' of this flange to a post 18 secured to the flange in some suitable fashion.

One end of a spring contact member 20 is also secured to the surface 14' by means of the post 18. The member 20 has an upwardly bent portion 21, a downward expanse 22, a lower bent portion 24, and an upward cam surface expanse 25 secured to a contact terminal member 26. Since the part 20 of this spring and the strap 17 are both held in place by the post 18 it follows that they are electrically connected. Diametrically opposite the post 18 is a similar post 28 which serves to hold in place the end portion of a spring contact member, which contact member, indicated generally at 29, is similar in construction to the spring member previously described. This member 29 also has a contact part 30 similar to the part 26. In addition to the end of the member 29 the post 28 also secures in place one end of an arcuate shaped strap 31; the other end of which is secured in place by a post 32. Spaced a slight distance from post 32 is a similar post 33. This post 33 serves to hold locked to the surface 14' a conducting strap 34 which has a continuation part 35 (Fig. 6) extending downward alongside the inner wall of the part 11 of the housing, and an end part 36 held to surface 11' of the bottom of part 11 by a screw 37. The end 36 is thereby secured also to an arcuate shaped strap 38 which extends around the surface 11' to a point substantially diametrically opposite the screw 37 at which point a second screw 38 serves to fasten the strap in the shell. A pair of substantially Z shaped conductors 40 have openings therein for the passage of screws 37 and 38 whereby these two conductors are electrically connected, both to the end part 36 and to the strap 38. These conductors 40 extend downward along the wall of a well part 41 in the member 11 across the bottom 42 thereof and downward alongside the opposite walls 44 of an opening in the actual bottom of the housing. The purpose of these conductors will be explained later.

A substantially U-shaped thermostatic bimetal trip member 45 has the legs thereof bent at right angles to the body thereof with these legs secured to the tops of the two posts 32 and 33. Secured to the surface 11' by means of a screw 46 is one end of a latch carrier 47. The top of this latch carrier is provided with an offset latch 48 and with an upstanding extension 49. The looped end of the U-shaped member 45 extends downwardly within the housing a distance sufficient to cause it to engage the upstanding part 49.

A bar 50 extends upwardly through the opening in the bottom of the housing in such close contact with the ends of the member 40 as to make good electrical connections therewith. The part 50 is of relatively short length terminating in a molded block 51 of some suitable insulating material. Also molded in this member 51 but in insulated relationship to the bar 50 is a second bar 52, a portion of which is adapted to serve as an intermediate barrier conducting bar. By means of this insulating connector 51 the two bars 50 and 52 are joined for simultaneous movement as desired. A button 54 can be secured to the end of the bar 50 to serve as a good terminal therefor.

The bar 52 is provided with a recess 55, the bottom of which is in register with the top of the connector 51. Extending upwardly in the recess 55 is a stud 56 formed integrally with the bar. Slidably on the bar 52 is a primary shutter made up of barrier side walls 60 and 61 and crosswalls 62 and 64. The crosswalls 62 and 64 have relatively thin top parts extending into dome-like portions 65 and 66 respectively. The lower parts of the dome-like portions 65 and 66 are hollowed out to form a cavity indicated generally at 67, in which cavity is positioned a coiled spring 68 one end of which rests on the top of the connector 51 and the other end of which rests against the top surface of the cavity 67. This spring 68 normally forces the entire primary shutter upwardly to the position shown in Figs. 3, 9 and 10.

Secured to the top of the bar 52 is a secondary shutter indicated generally at 70, which shutter has a substantially circular top 71, sloping sidewalls 72 and 73 and inclosing endwalls 74 and 75. This secondary shutter 70 has a through opening rectangular in cross-section for the reception of a reduced end part 76 of the bar 52. The top 71 of the shutter 70 can be dished slightly and is positioned to have the orifice therein in an alignment with the axis of the part 76. A screw 78 has the shank thereof in threaded engagement in an aperture of the part 76 to thereby lock the secondary shutter directly to the end of bar 52.

Secured to the tops of the two posts 18 and 28 is a hooded member 80 of general U-shape in cross-section, such member having sidewalls 81 and a top 82. Screws 84 pass through the top 82 into threaded openings in the posts 18 and 28. Depending from the top 82 are arcuate shaped walls 85 which in conjunction with the sidewalls 82 provide a cavity 86 which is circular in cross-section for the reception of the secondary shutter 70. Conical spring 87 is positioned in this cavity with one end thereof resting on the insulating block 77 on the top of screw 78 and the other end seated against the top of the cavity 86. Since this spring is of generally conical shape, it follows that the same can be compressed substantially into the form shown in Fig. 8, when the secondary shutter 70 is forced into the cavity 86.

The primary shutter, the secondary shutter and the hood previously described are constructed of some suitable insulating material, such as porcelain, any suitable ceramic material or any other material of a like or kindred character.

The wall 61 of the primary shutter has an extension 90 provided with a flat top and with a sloping edge which extension forms in effect a lug to be engaged by the latch 48. The wall 60 of the primary shutter is provided with an enlargement 91 in which is cut a diagonal slot 92 (Fig. 4). A telltale device 94 of U-shape in cross-section and of metal or any other suitable material is slidably mounted on the top of the hood 80. This telltale 94 has a slot 95 therein as shown in Fig. 4. A standard 96 is secured by a screw 97 to the surface 14' and a lever 98 is pivotally secured to such standard by a headed pin 99. A roller 100 is secured to one end of the lever 98 in position to ride in the diagonal slot 92 while a second roller 101 is secured to the other end of the lever 98 to ride in the slot 95. Due to this arrangement vertical movement of the primary shutter causes reciprocation of the telltale along the hood 80. A pin 102 secured to one wall of the hood serves as a stop.

The telltale 94 may be provided with targets 104 and 105 which targets will be visible through a transparent window 106 positioned in the top of the housing. The purpose and operation of these targets will be explained later.

Figure 3:
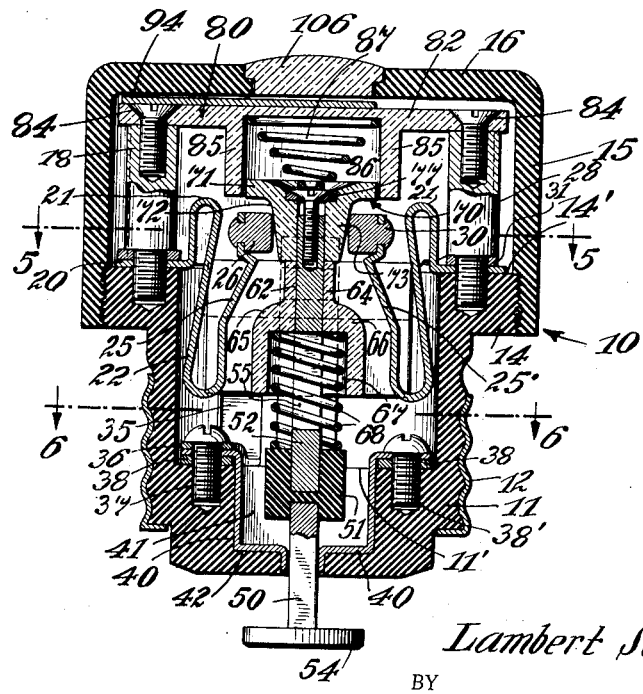
Fig. 3 is a section taken substantially on the line 3—3 of Fig. 1.
Figure 8:
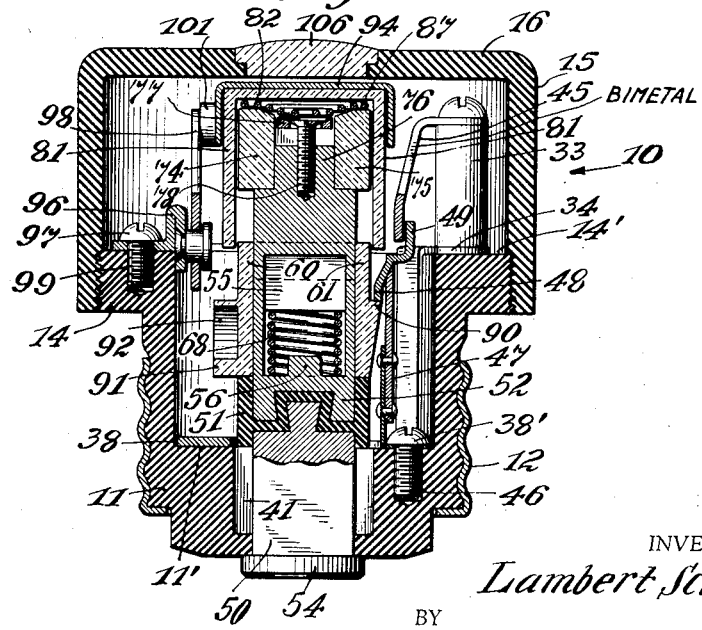
Fig. 8 is a section taken substantially on the line 8—8 of Fig. 7.
Figure 11:
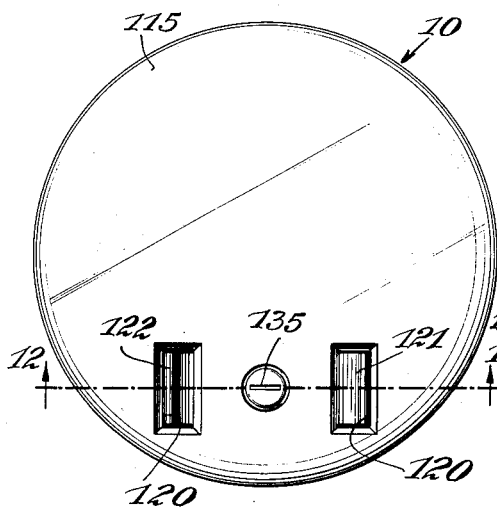
Fig. 11 is a plan view of a modification of the invention.
Figure 13:
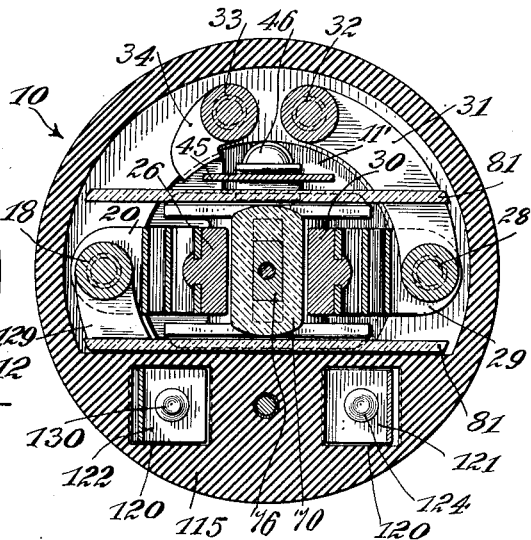
Fig. 13 is a section taken substantially on the line 13—13 of Fig. 12.

The operation and use of the device just described is substantially as follows: the relative position of the various parts of the device prior to insertion of the device into a cut-out is shown in Fig. 3. In this view it will be seen that the bar 50 extends beyond the bottom of the housing, the spring 68 is in expanded condition and also the spring 87 is in expanded condition. The sidewalls 72 and 73 of the secondary shutter are interposed between the terminals 26 and 30 on the spring contact members and at the same time as shown in Fig. 8 the lug 90 on the sidewall 61 of the primary shutter is engaged by the latch 48.

When it is desired to make use of the device, the housing may be screwed into an ordinary cut-out in the same manner as is followed in the use of conventional types of fuse plugs. As the housing is screwed into a cut-out socket the button 54 on the end of the bar 50 engages the center terminal of the cut-out socket before the device has become completely inserted in the cut-out, and consequently full insertion of the housing into the cut-out forces the bar 50 inwardly relative to the housing, or in other words causes the parts to assume the positions shown in Figs. 7 and 8. Since the bar 50 is a component part of a composite bar including also the bar 52, the connector 51 and the secondary shutter 70, it follows that all of these parts are moved upwardly until the spring 68 and the spring 87 become compressed. Since the lug 90 is in engagement with the latch 48 it follows that the primary shutter does not move upwardly and consequently the spring 68 does become compressed. Due to this upward movement of the secondary shutter 70 the terminals 26 and 30 are free to move inwardly due to spring tension with the part 110 of the bar 52. As the secondary shutter 70 nears the end of its upward movement the terminals 26 and 30 snap into contact with portion 110 of bar 52 with great rapidity. The parts 50 and 52 of the composite bar are made of some good electric conducting material so that under suitable conditions current is free to flow from one of the terminals of the pair 26—30 to the other thereof through this barrier bar portion 110.

Figure 7:
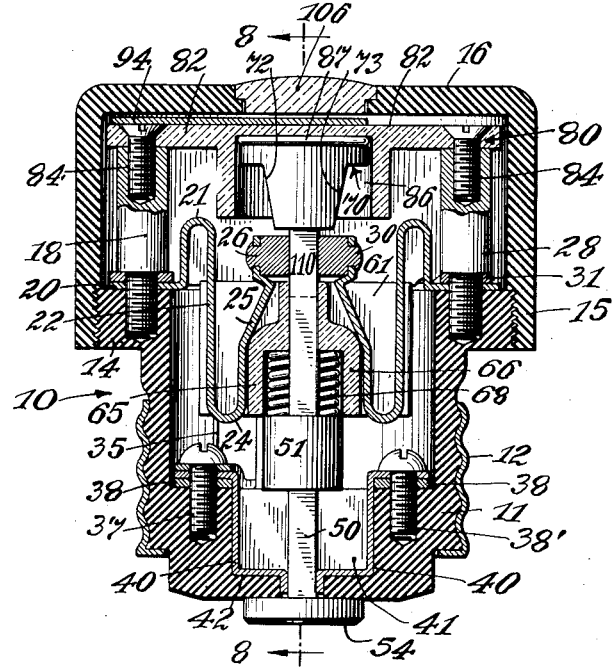
Fig. 7 is a section similar to that of Fig. 3 showing the operating parts in circuit-closing position.

When the parts of the device are in the condition shown in Figs. 7 and 8 and are located in a cut-out, the electric circuit established thereby may be traced substantially as follows: from the conducting shell 12 through the strap 17 to post 18 thence to the spring contact terminating in the terminal 26; through the barrier conducting portion 110 to terminal 30; thence to post 28; through strap 31 to post 32; through the thermostatic bi-metal trip element 45 to the post 33; thence through strap made up of parts 34, 35 and 36 to the screw 37 and to arcuate shape strap 38 and screw 38'; and from these screws 37 and 38' to the members 40, which have parts bearing against the bar 50; and from this bar 50 through the button 54 to the center terminal of the cut-out. The shell 12 of course, is in contact with the other terminal of the cut-out provided by the shell thereof. In this manner a complete circuit through the device is furnished, which circuit will remain closed so long as the current flow through the device is not of excess amperage.

When the parts are in this position the roller 100 is in the top of the diagonal slot 92 as shown in full lines in Fig. 4 and consequently the target 104 is positioned under the window 106. This target 104 preferably will have some indicia to indicate amperage which the device has been designed to carry and at the same time this target may indicate that the parts are in circuit closing position.

Should the circuit become overloaded the thermostatic bi-metal trip 45, which is included in series in the circuit, will become actuated and will so flex as to move the upstanding bar 49 of the latch assembly from the position shown in Fig. 8 to the position shown in Fig. 10, wherein it will be seen that this latch assembly has moved away from the primary shutter an amount sufficient for the latch 48 to clear the lug 90. As soon as such clearance is provided the spring 68 forces the primary shutter upwardly. As such upward movement progresses the rounded edges of the dome-like parts 65 and 66 contact with the sloping cam surfaces 25 of the two spring contacts forcing the terminals 26 and 30 carried thereby simultaneously away in opposite directions from the conducting barrier portion 110. At the same time the walls 62 and 64 of this primary shutter move upwardly to positions occupying the space formerly occupied by the terminals 26 and 30 on each side of the barrier 110 until finally these walls 62 and 64 have their upper ends engaging the lower ends of the sloping walls 72 and 73 of the secondary shutter. From this action it will be seen that the circuit is practically instantaneously interrupted due to the forceful separation of the terminals 26 and 30 from the barrier 110. As the primary shutter is moved upwardly under the impetus of spring 68 the roller 100, which rides in slot 92, causes the lever 98 to be moved from the full line position of Fig. 4 to the dotted line position of the same figure. This movement necessarily causes sliding of the telltale 94 until the target 105 is positioned beneath the window 106. This target 105 may be colored, for example in red, to indicate that the parts of the circuit breaker have operated to interrupt current flow therethrough.

Since upon inspection of the device, the telltale target indicates that the circuit has been interrupted, the entire device may be removed from the cut-out, upon which movement the parts will automatically be restored to the normal position shown in Fig. 3. Such restoration is accomplished by the expansion of spring 87 acting on the end of the composite bar through the secondary shutter 70 to force this bar and also the primary shutter downwardly. The two terminals 26 and 30 resting against the walls 62 and 64 of the primary shutter are then engaged by the walls 72 and 73 of the secondary shutter. The spring 87 is of sufficient strength to hold the primary and secondary shutters in contact against the resiliency of the spring contacts carrying these terminals 26 and 30. The downward movement continues until the lug 90 is again engaged by the latch 48 and until the proper target on the telltale has been moved into visible position indicating the device has been reset. It is to be understood of course that the thermostatic bi-metal trip; once current flow has been interrupted, resumes its normal position permitting the latch 48 to be restored to normal position shown in Fig. 3. Thus the device is again in condition to be re-inserted into the cut-out from which it has been removed or it could be inserted in any other suitable cut-out. Should it be inserted in the same cut-out and the overload continues the device will operate again in the same manner to interrupt the flow of current therethrough and a repetition of this procedure will indicate clearly that some part of the apparatus associated with the cut-out is shorted or materially overloaded. Consequently the device serves not only as a protection for apparatus energized by the circuit including the same, but also serves efficiently as an indicator of some fundamental error in the circuit, all without the destruction of any part of the device.

In Figs. 11 to 14 inclusive, a modification has been illustrated. The device so illustrated is adapted especially as a branch circuit breaker and a protective device for any individual appliance or group of appliances in a circuit which may otherwise be protected by a device of a larger capacity. The operating parts of this modification are substantially similar to those previously described with a few exceptions. Accordingly parts which are similar to those described in connection with Figs. 1 to 10 inclusive have had the same reference characters applied thereto. The housing is composed of a portion 111 the periphery of which is not provided with threads but is of truly cylindrical form and also a portion 115 forming a top for the housing. The window 106 has been omitted but the top surface of the portion 115 is provided with two spaced openings 120 disposed eccentrically and near one edge thereof. These openings 120 are in register with two spring contact members 121 and 122 which are seated in cavities to provide in effect sockets for the reception of the terminal prongs of an ordinary two-prong plug. These two contact members may be made in any desired shape, one form being shown wherein the parts are of fragmentary triangular configuration. The bases of the two contacts are secured directly to the annular internal surface 14'. One member 121 is fastened to this surface by means of a conducting bar or rod 124 which extends downwardly through the wall of the portion 111 to a conducting strap 125 fastened in the bottom of the portion 111 by some suitable arrangement. Strap 125 extends to a connecting screw 126 which serves to electrically connect the strap to an arm 127 of a contact prong 128 which in turn extends downwardly through the bottom of the portion 111. This prong 128 serves as one terminal of the device, being substituted for the conducting shell 12 of the previous device.

The other contact 122 is secured together with a strap 129 to the surface 14' by means of a headed overscrew 130, or by any other suitable arrangement. This strap 129 extends to a post 18 in the same manner as the strap 17 previously described.

A crank indicated generally at 131 has one arm portion 132 movable to contact with the end of bar 50. The button 54 has been omitted from this construction. The other arm 134 of the crank 131 is movable into a position in parallelism with the prong 128 and this arm 134 serves as another terminal prong whereby the device is in effect provided with two contact prongs similar to those of an ordinary plug. A long headed-screw member 135 passes through an opening in the portion 115 into threaded engagement with an aperture in the portion 111 so that openings 120 can be accurately brought into alignment with the contacts 121 and 122 when the casing is assembled. The remaining parts of the device are similar to those previously described with the exception that the telltale 94 and the operating parts associated therewith have been omitted.

Figure 12:
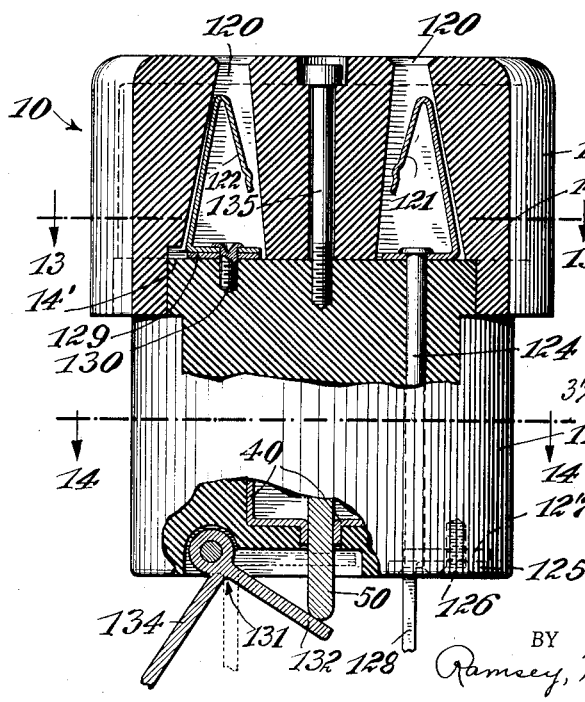
Fig. 12 is a section taken substantially on the line 12—12 of Fig. 11.
Figure 14:
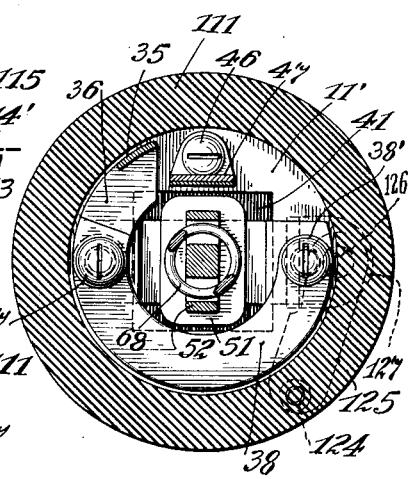
Fig. 14 is a section taken substantially on the line 14—14 of Fig. 12.

The operation and use of this modified form of the invention is substantially as follows: the two prongs 128 and 134 can be introduced into a proper receptacle by so moving the crank 131 into a position shown in dotted line in Fig. 12. When this movement has been accomplished the bar 50 will necessarily be forced upwardly relative to the housing, which movement causes the spring terminal members within the housing to be brought into contact with the conducting barrier therein in the same manner as that previously described. However current cannot flow through the device until a lug associated with some appliance has had its prongs inserted into the openings 120 and thereby into contact with the members 121 and 122. Under these conditions a circuit may be traced from the prong 128 through arm 127 to the strap 125; thence to the connecting rod 124 and to the contact 121. From this contact 121 current flows through the appliance and to the contact 122, after which the circuit continues through the operating parts of the circuit breaker to the bar 50 and thence to prong 134 completing the circuit. Should the circuit become overloaded the trip mechanism operates in the same manner as previously described, in turn interrupting the flow of current from one spring terminal to another through the conducting barrier. When the device has been operated to interrupt current flow the same can be automatically reset by removing the entire device from its receptacle, as a result of which a spring 87 (not shown but similar to that of preceding figures) will force the composite bar terminating in the part 50 to the full line position of Fig. 12 thereby restoring all of the parts to their initial position. The device can then be re-inserted in its receptacle and the operation thereof carried out in the same cycle.

It is to be understood of course, that a branch circuit breaker of this character can be constructed in such form as to permit it to be engaged in an ordinary screw threaded receptacle instead of a receptacle for the accommodation of parallel prongs. In this event the housing construction shown in Figs. 1 to 10 may be used with the threaded shell on the bottom of the housing. The only change would be the provision of two members 121 and 122 with the member 121 connected electrically to the metallic threaded shell instead of having this shell electrically connected directly to the post 18.

Figure 15:
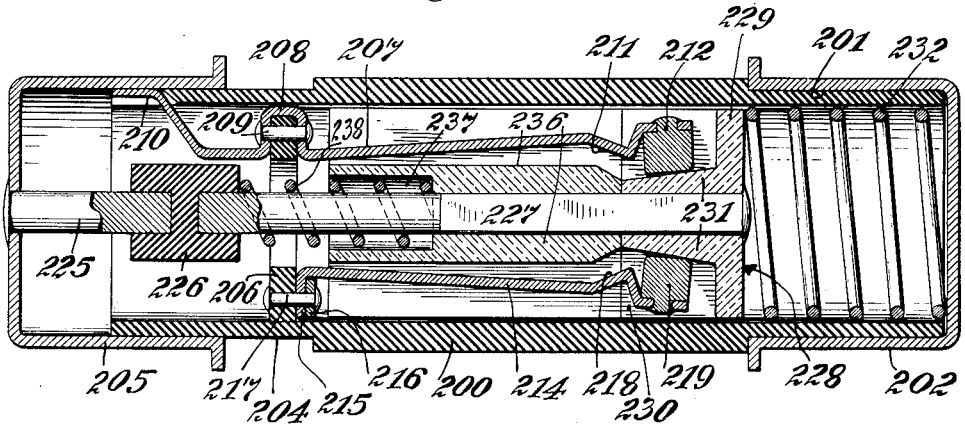
Fig. 15 is an axial section of a circuit breaker embodying the invention and mounted within a housing adapted to replace cartridge fuses.
Figure 16:
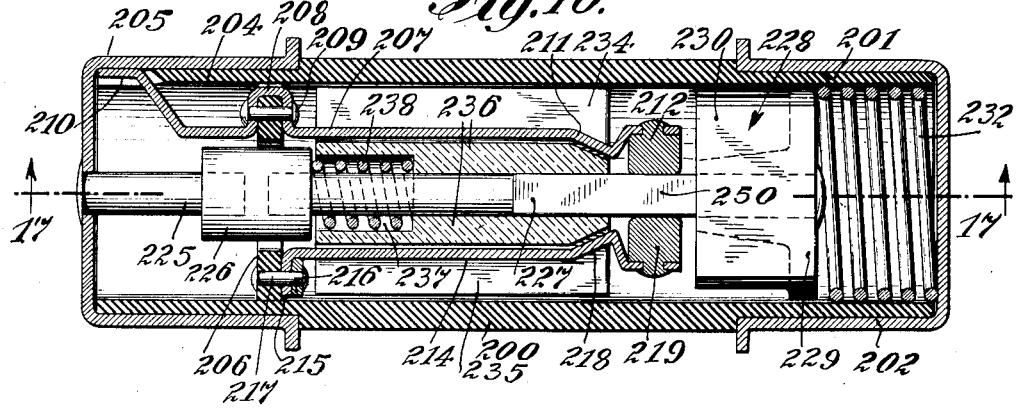
Fig. 16 is a similar section showing the operating parts in a different position.
Figure 17:
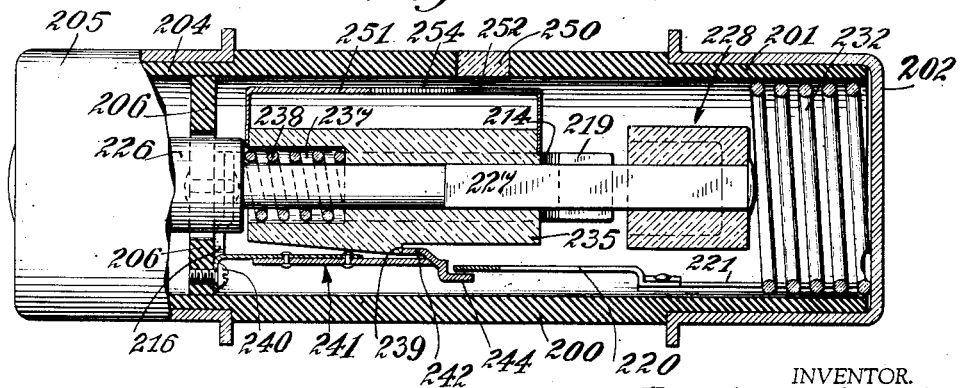
Fig. 17 is a section taken substantially on the line 17—17 of Fig. 16.

In Figs. 15 to 17 inclusive the invention has been illustrated as being embodied in a structure similar in configuration to the well known cartridge fuses. In these figures 200 represents a tubular shell of some suitable insulating material such as fibre, phenol condensation, etc. One end of the tubular shell 200 is of reduced external size as shown at 201 for the reception of a metallic cap 202 permanently fastened thereto in some suitable manner. The other end of the shell also has a portion of reduced external diameter 204 on which is slidably mounted a metallic cap 205.

Permanently secured within the shell 200 is a ring 206 of similar insulating material. A member 207 of some good conducting spring material has a U-portion 208 fastened to the ring 206 by a rivet 209. One end of this member 207 is bent outwardly as shown at 210 and passes through a slot in the shell 200 to engage the cap 205. The other end of the member 207 is shaped as shown, being provided with a cam surface 211. A terminal 212 is fastened to the end of this member 207.

A second member 214 also of some conducting spring material terminates with a flange 215 on top of ring 206 and this flange 215 is secured together with a strap 216 to the ring by a rivet 217. The member 214 has a cam surface 218 and also a terminal 219 similar to terminal 212. The conducting strap 216 extends upwardly along the inner wall of the shell 200 in a manner not shown and is connected to one end of a U-shaped thermostatic bi-metal trip 220, similar to the trip member 45 in the other embodiments. The two ends of this member 220 may be secured directly to the inner wall of shell 200 and one end thereof is connected by a conductor 221 to the metallic cap 202. Naturally this connection is from the opposite end of the member 220 from that to which the strap 216 is connected.

A composite rod is secured within the complete assembly; such rod being composed of a metallic rod 225 imbedded in an insulating connector 226, which also has imbedded therein a metallic rod 227, and finally a secondary shutter indicated generally at 228. This secondary shutter is made up of a top 229, sidewalls 230 and tapering crosswalls 231. This secondary shutter is permanently secured to an end of this bar 227. One end of the bar 225 is permanently fastened to the slidable cap 205. A coil spring 232 is interposed between the bottom of the cap 202 and the top of the secondary shutter 229, which shutter is composed entirely of some suitable insulating material.

This modification also makes use of a primary shutter likewise composed of some suitable insulating material and comprising parallel sidewalls 234 and 235 and cross-walls 236. These cross-walls are hollowed out to form a cavity 237 within which is mounted a coiled spring 238, one end of which bears against the top of the insulating connector 226. The sidewall 235 of this shutter is provided with a lug-like extension 239, which extension is provided with a tapered side edge.

Secured to the top of ring 206 by a screw 240 is a part of a latch assembly indicated generally at 241 and including a latch 242 and an upward extension 244 which normally lies adjacent the lower end or loop of the U-shaped member 220. The primary shutter is capable of axial movement relative to the bar or rod 227.

If desired the device shown in Figs. 15 to 17 can also be provided with some telltale arrangement for indicating the condition of the operating parts. Such arrangement has been shown in Fig. 17 wherein the casing 200 is provided with a window 250 filled with some transparent material and the primary shutter is provided with an extension 251 on the surface of which are mounted some indicia 252 and 254. The indicia 252 and 254 will be moved into alignment with the window 250 at different stages in the operation of the device.

The operation of this device is substantially as follows: Fig. 15 illustrates the position of the parts prior to insertion of the same in clip terminals of the type commonly associated with cartridge fuses. This position may be called the normal position of the cartridge. As will be seen from an inspection of this figure the two terminals 212 and 219 are held in spaced relation and insulated from a barrier portion 250 of the bar 227 by the secondary shutter. The device may be inserted into the proper clip terminals of a cut-out by first inserting the cap 205 in one of the clip terminals, forcing the shell 200 toward the end of this cap until it assumes the position of Fig. 16 and then inserting the other cap 202 in the other clip terminal. Due to such movement of the parts of the device, the composite bar within the casing has been moved until one end thereof is closer to the end of cap 202 than in normal position thereby compressing spring 232. At the same time the secondary shutter 228 has been moved out of the path of movement of terminals 212 and 219 permitting these terminals, due to the resiliency of members 207 and 214, to come into contact with the barrier part 250 of bar 227. This bar naturally is of some good conducting material. The primary shutter is restrained from movement due to the interengagement between the latch 242 and the lug 239. In this circuit-closed position (Fig. 16) a circuit is completed through the device from one clip terminal to the other of the cut-out. This circuit may be traced as follows: from the clip terminal holding cap 205 to this cap 205; from cap 205 to end 210 of member 207; through this member 207 to terminal 212 then through barrier portion 250 to terminal 219; from terminal 219 through member 214 to conducting strap 216 and thence to one end of the U-shaped thermostatic bi-metal trip 220; through this member 220 to the conductor 221 electrically connected to the cap 202 and from this cap to the other clip terminal.

Since all current flowing through the device must necessarily flow through the U-shaped member 220 and since this member will be designed to flex upon a predetermined overload it follows that should such overload occur this member is flexed in such fashion that the loop part thereof moves toward the wall of the housing forcibly moving the upstanding part 244 along with it until the latch 242 clears the lug 239 thereby releasing the primary shutter from its restraint. As soon as such release occurs the spring 238 forces the primary shutter toward the secondary shutter thereby causing the cam surfaces at the tops of the walls 236 to engage the cam surfaces 211 and 218 forcing the two terminals 212 and 219 simultaneously out of contact and in opposite directions with the barrier part 250. As this primary shutter continues its movement toward the secondary shutter, through the impetus of spring 238, the cross-walls finally become interposed between the barrier part 250 and the terminals 212 and 219. This operation naturally interrupts the circuit through the device.

The device can be restored automatically to normal position by simply removing it from the clip terminals of the cut-out; upon which movement the spring 232 expands acting against the head of the secondary shutter 228 to force the composite bar away from cap 202, until this bar and the movable cap 205 together with all operating parts assume the normal position of Fig. 15. The device, having been reset, can be inserted in a cut-out in the same fashion as before described.

During the use of the device the telltale arrangement shown in Fig. 17 may also be used. For example while the primary shutter is locked in normal position by the latch 242 the indicating portion 252 of the telltale will be in alignment with the window 250. This portion 252 may have some indication thereon as to the amperage for which the fuse has been designed, or may be colored in some suitable fashion to indicate that the device is in condition to permit the closing of the circuit therethrough. When the primary shutter has been released by the action of the trip 220 upon an overload or a short the portion 254 of the telltale is automatically moved into alignment with the window 250. This portion 254 may be colored red or may have some indication thereon to make readily apparent that the parts have operated to interrupt current flow.

In Figs. 18 and 19 a modified form of trip arrangement has been shown, which modification is particularly adaptable to use in connection with the forms of the invention shown in Figs. 1 to 14 inclusive. In these figures 260 represents a surface corresponding to the surface 14'. To this surface are secured two Z-shaped brackets 261 and 262 together with conducting straps 264 and 265, which latter straps correspond to the straps 34 and 31 respectively. Use is made of a thermostatic bimetal trip member composed of legs 266 and 267 and a loop portion 268 joining these legs. The upper ends of the legs are bent over and riveted or otherwise secured to the tops of the two brackets 261 and 262.

The loop part 268 of the trip member is provided with an aperture in which is fitted a bushing 269. An L-shaped leaf spring 270 is bent as shown in Fig. 18 and is held in proper assembly with the trip by means of a screw 271 passing through an opening near the top of the spring into threaded engagement with an opening in the leg 266; and by a headed trip member 272 which passes through an opening near the bottom of the spring 270 and through the bushing 269. A second leaf spring 274 has one end riveted or otherwise secured to the leg 267 as indicated at 275 while the other end bears against the head of the member 272. This spring 274 of necessity is arranged in angular relation to the leg 267.

The use and operation of this arrangement is substantially as follows: as will be apparent from the drawings the end of member 272 extends beyond the bushing 269 and lies in the path of movement of a part of the primary shutter and normally will engage a lug 276 thereon, which lug corresponds to lug 90 previously described. In some instances it may be desirable to adjust the trip mechanism during the assembly thereof so that the device will operate to interrupt current flow upon a predetermined overload. To this end the screw 271 may be adjusted to force the upper end thereof closer to or further from the leg 266. Since this member 270 has a bent portion 277 resting against the leg, the member is in effect fulcrumed along the line of this portion 277 so that movement of the top part thereof causes movement of the bottom part thereof forcing the member 272 outwardly against the resilience of spring 274 or inwardly. Thus the length of the part of member 272 in engagement with the lug 276 can be accurately predetermined so that the degree of flexing of the bimetal release member can be properly gauged to cause a release of the primary shutter at any condition of overload for which the device may be designed.

The hereinbefore described method of interruption of a circuit possesses the advantages that such interruption can be accomplished substantially without any destructive arcing between the moving parts. In practice it has been found that this method, which embodies the step of moving two terminals simultaneously at the same rate of movement away from a conducting barrier, serves to prevent such arcing. While the desired movement has been shown and described as being effected by a shutter which forcibly moves these terminals away from the barrier, it is to be understood that other arrangements for accomplishing such movement can be employed. For example, springs may be utilized for moving the terminals away from the opposite sides of the barrier, in which event a release mechanism would be employed in connection with the springs and in which embodiment it would be necessary for the springs to have substantially the same tension. It is essential that the two terminals be moved out of contact with the opposite sides of the conducting barrier simultaneously, since movement of one terminal prior to movement of the other will cause destructive arcing. The shutter arrangements disclosed herein constitute the preferred form of actuating mechanism for accomplishing these purposes since the wall which engages the terminals or members carrying the terminals can be symmetrically and accurately shaped so that simultaneous departure of the terminals from the barrier can be assured. Moreover the shutter arrangements shown possess the advantages in that they provide chambers which are of insulating material to isolate or totally enclose each terminal so that these terminals are walled in and thereby arcing paths are eliminated and the paths for the flow of current to cause destructive arcing are so tortuous as to, under ordinary circumstances, completely eliminate such arcing. The primary shutter, since it is moved with great rapidity by its actuating spring serves to quench any arc which might start under severe conditions before such arc can reach the destructive stage. The U-shaped hood member described with the first two embodiments of the invention provide a top for the isolation chambers in which the terminals are located after current interruption. The secondary shutter which is interposed between the terminals during resetting of the device assures that these terminals cannot be moved to circuit-closing position until the device has been properly inserted in the cut-out designed to receive the same.

A further change may be made in the device whereby the sliding contact between the bar 50 and the members 40 to assure good electric contact can be replaced by a flexible conductor connected to the bar 50 and also connected to some suitable point in the circuit. Such arrangement may simplify the construction to some extent.

If desired means may be provided for manually tripping the device so that the flow of current can be controlled for test or other purposes. To this end a lever may be provided in any of the arrangements shown, such lever being so mounted as to extend through the casing of any arrangement and also being so mounted that manipulation of the lever will cause release of the latch from the shutter to interrupt current flow.

It is to be understood that the principles of the present invention can be employed in devices other than those operating automatically upon an overload. Manually operated switches and other switches may be so constructed as to embody the salient features of the present invention. Accordingly the device is capable of modification beyond the illustrated embodiments and any limitations imposed thereupon are to be only those defined by the following claims.

What is claimed is:

1. A device of the character described comprising a casing for insertion in a cut-out, a conducting member in said casing, a pair of movable contact terminals in said casing, insulating means for initially insulating said contact terminals from said conducting member, said means being movable, upon insertion of said device into a cut-out, out of the path of said contact terminal whereby said contact terminals engage opposite sides of said conducting member to close a circuit through said device, and means operable upon overload for moving said contact terminals simultaneously in opposite directions from said conducting member to interrupt the circuit through said device.

2. A device of the character described comprising a casing for insertion in a cut-out, a conducting member in said casing, a pair of movable contact terminals in said casing, insulating means for initially insulating said contact terminals from said conducting member, said means being movable, upon insertion of said device into a cut-out, out of the path of said contact terminals whereby said contact terminals engage opposite sides of said conducting member to close a circuit through said device, means operable upon overload for moving said contact terminals simultaneously in opposite directions from said conducting member to interrupt the circuit through said device, and an insulating shutter movable simultaneously into position between said contact terminals and said conducting member.

3. A circuit breaker so constructed and arranged as to cooperate with a cut-out, said circuit breaker comprising a casing, a conducting member in said casing, a pair of movable contact terminals in said casing, insulating means for initially insulating said contact terminals from said conducting member, said means being movable, upon insertion of said device into a cut-out, out of the path of said contact terminals whereby said contact terminals engage opposite sides of said conducting member to close a circuit through said device, means operable upon overload for moving said contact terminals simultaneously in opposite directions from said conducting member to interrupt the circuit through said device, and means operable upon withdrawal of said device from a cut-out after a circuit interruption for restoring the parts thereof to initial position.

4. A circuit breaker so constructed and arranged as to cooperate with a cut-out, said circuit breaker comprising a casing, a conducting member in said casing, a pair of movable contact terminals in said casing, insulating means for initially insulating said contact terminals from said conducting member, said means being movable, upon insertion of said device into a cut-out, out of the path of said contact terminals whereby said contact terminals engage opposite sides of said conducting member to close a circuit through said device, means operable upon overload for moving said contact terminals simultaneously in opposite directions from said conducting member to interrupt the circuit through said device, an insulating shutter movable simultaneously into position between said contact terminals and said conducting member, and means operable upon withdrawal of said device from a cut-out after a circuit interruption for restoring the parts thereof to initial position.

5. A device of the character described comprising a casing for insertion in a cut-out, a conducting member movably mounted in said casing, contact terminals movable into and out of contact with opposite sides of said conducting member, a secondary shutter of insulating material secured to said conducting member for movement therewith, said secondary shutter being initially in position separating said contact terminals from said conducting member, said conducting member, contact terminals and secondary shutter being movable upon insertion of said device into a cut-out, into positions wherein said contact terminals engage said conducting member to complete a circuit through said device, and a primary shutter of insulating material movable, upon a circuit overload, to force said contact terminals simultaneously away from said conducting member and to interpose parts of said primary shutter between said contact terminals and said conducting member.

6. A device of the character described comprising a casing for insertion in a cut-out, a conducting member movably mounted in said casing, contact terminals movable into and out of contact with opposite sides of said conducting member, a secondary shutter of insulating material secured to said conducting member for movement therewith, said secondary shutter being initially in position separating said contact terminals from said conducting member, said conducting member, contact terminals and secondary shutter being movable upon insertion of said device into a cut-out, into position wherein said contact terminals engage said conducting member to complete a circuit through said device, and a primary shutter of insulating material movable upon a circuit overload, to force said contact terminals simultaneously away from said conducting member and to interpose parts of said primary shutter between said contact terminals and said conducting member, said conducting member being movable, upon removal of said device from a cut-out after a circuit interruption, to restore all of the parts of said device to initial positions.

7. A device of the character described comprising a casing for insertion in a cut-out, a conducting member movably mounted in said casing, contact terminals movable into and out of contact with opposite sides of said conducting member, a secondary shutter of insulating material secured to said conducting member for movement therewith, said secondary shutter being initially in position separating said contact terminals from said conducting member, an external terminal for said device, said external terminal being connected to and insulated from said conducting member whereby movement of said external terminal caused by insertion of said device into a cut-out causes movement of said conducting member and said secondary shutter into positions wherein said contact terminals engage said conducting member to complete a circuit through said device, and a primary shutter of insulating material movable upon a circuit overload, to force said contact terminals simultaneously away from said conducting member and to interpose parts of said primary shutter between said contact terminals and said conducting member.

8. A device of the character described comprising a casing for insertion in a cut-out, a conducting member movably mounted in said casing, contact terminals movable into and out of contact with opposite sides of said conducting member, a secondary shutter of insulating material secured to said conducting member for movement therewith, said secondary shutter being initially in position separating said contact terminals from said conducting member, said conducting member, contact terminals, and secondary shutter being movable upon insertion of said device into a cut-out, into positions wherein said contact terminals engage said conducting member to complete a circuit through said device, a primary shutter of insulating material movable upon a circuit overload, to force said contact terminals simultaneously away from said conducting member and to interpose parts of said primary shutter between said contact terminals and said conducting member, and a hood of insulating material cooperating with said shutters to form isolation chambers for said contact terminals.

9. A device of the character described comprising a housing, a composite bar slidable within said housing and having a conducting portion therein, a second conducting portion of said bar extending through said housing and being insulated from the first conducting portion, a pair of contact terminals movable into and out of contact with opposite sides of said first conducting portion, a shutter of insulating material secured to said bar for movement simultaneously therewith in one direction and for independent movement in the other direction, said shutter being normally restrained against independent movement, means operable upon a predetermined overload for releasing said shutter for independent movement to cause simultaneous movement of said contact terminals away from said conducting portion and for causing interposition of part of said shutter between said contact terminals and said conducting portion, said second mentioned conducting portion serving as one external terminal for said device and a second terminal secured to the exterior of said device whereby said device can be inserted in a receptacle.

10. A device of the character described comprising a housing, a composite bar slidable within said housing and having a conducting portion therein, a second conducting portion of said bar extending through said housing and being insulated from the first conducting portion, a pair of contact terminals movable into and out of contact with opposite sides of said first conducting portion, a shutter of insulating material secured to said bar for movement simultaneously therewith in one direction and for independent movement in the other direction, said shutter being normally restrained against independent movement, means operable upon a predetermined overload for releasing said shutter for independent movement to cause simultaneous movement of said contact terminals away from said conducting portion and for causing interposition of part of said shutter between said contact terminals and said conducting portion, a pair of external contact prongs for said device, one of said prongs being pivotally mounted to engage said second conducting portion, and a pair of socket terminals in said housing to receive the contact prongs of a plug.

11. A device of the character described comprising a substantially tubular housing, a cap of conducting material rigidly secured to one end thereof, a second cap of conducting material slidably secured to the other end thereof, a conducting member within said housing, a pair of contact terminals mounted for movement into and out of contact with opposite sides of said conducting member and a shutter of insulating material slidably secured to said conducting member and means operable upon a predetermined overload for introducing a part of said shutter between said terminal members and said conducting member and for moving said contact terminals simultaneously away from said conducting member to interrupt current flow, said caps being connected through said contact members whereby a circuit is completed when said contact members are in contact with said conducting member.

12. A circuit breaker so constructed and arranged as to cooperate with a cutout, said circuit breaker having a conducting member and a pair of terminals therein, said terminals being movable, upon engagement of said circuit breaker in said cut-out, into position engaging said conducting member to complete a circuit through said circuit breaker, and means operable upon overload for moving said terminals simultaneously in opposite directions out of contact with said conducting member.

13. A circuit breaker so constructed and arranged as to cooperate with a cutout, said circuit breaker having a conducting member and a pair of terminals therein, said terminals being movable, upon engagement of said circuit breaker in said cut-out, into position engaging said conducting member to complete a circuit through said circuit breaker, and means operable upon overload for moving said terminals simultaneously in opposite directions out of contact with said conducting member while said conducting member is maintained stationary.

14. A circuit breaker so constructed and arranged as to cooperate with a cutout, said circuit breaker having a conducting member and a pair of terminals therein, said terminals being movable, upon engagement of said circuit breaker in said cut-out, into position engaging said conducting member to complete a circuit through said circuit breaker, means operable upon overload for moving said terminals simultaneously in opposite directions out of contact with said conducting member, and a shutter of insulating material movable simultaneously into position between said terminals and said conducting member.

15. A circuit breaker so constructed and arranged as to cooperate with a cutout, said circuit breaker having a conducting member and a pair of terminals therein, said terminals being movable, upon engagement of said circuit breaker in said cut-out, into position engaging said conducting member to complete a circuit through said circuit breaker, means operable upon overload for moving said terminals simultaneously in opposite directions out of contact with said conducting member, a shutter of insulating material movable simultaneously into position between said terminals and said conducting member, and wall members of insulating material cooperating with said shutter to form isolation chambers for said terminals.

LAMBERT SCHMIDT.